United States Patent
Munch et al.

(10) Patent No.: US 6,580,364 B1
(45) Date of Patent: Jun. 17, 2003

(54) APPARATUS AND METHOD FOR TRACKING AN ABNORMAL TIRE CONDITION

(75) Inventors: Carl A. Munch, Troy, MI (US); Daniel J. Wyman, Canton, MI (US); Timothy DeZorzi, South Lyon, MI (US); Mark R. Desmarais, East Sandwich, MA (US)

(73) Assignee: TRW Inc., Lyndhurst, OH (US)

( * ) Notice: Subject to any disclaimer, the term of this patent is extended or adjusted under 35 U.S.C. 154(b) by 522 days.

(21) Appl. No.: 09/611,715

(22) Filed: Jul. 6, 2000

(51) Int. Cl.[7] .............................................. B60C 23/00
(52) U.S. Cl. ...................... 340/447; 340/442; 340/438; 73/146.5; 116/34 R
(58) Field of Search ................................ 340/447, 442, 340/438, 449, 445, 439, 539; 73/146.5, 146.4; 116/34 R (56) References Cited

U.S. PATENT DOCUMENTS

| | | | |
|---|---|---|---|
| 4,186,377 A | 1/1980 | Barabino | 340/58 |
| 4,909,074 A | 3/1990 | Gerresheim et al. | 73/146.4 |
| 5,463,374 A * | 10/1995 | Mendez et al. | 340/442 |
| 5,559,484 A | 9/1996 | Nowicki et al. | 340/447 |
| 5,578,984 A | 11/1996 | Nakajima | 340/444 |
| 5,581,464 A | 12/1996 | Woll et al. | 364/424.04 |
| 5,612,671 A * | 3/1997 | Mendez et al. | 340/447 |
| 5,731,754 A | 3/1998 | Lee, Jr. et al. | 340/447 |
| 5,741,966 A | 4/1998 | Handfield et al. | 73/146.5 |
| 5,754,965 A | 5/1998 | Hagenbuch | 701/35 |
| 5,774,048 A * | 6/1998 | Achterholt | 340/447 |
| 5,783,992 A * | 7/1998 | Eberwine et al. | 340/445 |
| 5,825,286 A | 10/1998 | Coulthard | 340/447 |
| 6,271,748 B1 * | 8/2001 | Derbyshire et al. | 340/442 |
| 6,359,556 B1 * | 3/2002 | Katou | 340/506 |
| 6,453,897 B1 * | 9/2002 | Kanno | 123/684 |
| 6,486,776 B1 * | 11/2002 | Pollack et al. | 340/521 |

OTHER PUBLICATIONS

U.S. DeZorzi Patent Application filed Jun. 26, 2000 entitled Apparatus and Method for Controlling a Tire Condition Module of a Vehicle Tire.

* cited by examiner

Primary Examiner—Daniel J. Wu
Assistant Examiner—Phung Nguyen
(74) Attorney, Agent, or Firm—Tarolli, Sundheim, Covell, & Tummino L.L.P.

(57) ABSTRACT

An apparatus (12) for tracking an abnormal condition of a vehicle tire (20, 22, 24) includes a receiver (62) that receives a data message having data indicative of a condition of the vehicle tire (20, 22, 24). A controller (64) is connected to the receiver (62) and is responsive to the data message received by the receiver (62). The controller (64) includes a counter that has a value indicative of a duration of an abnormal tire condition. The controller (64) adjusts the counter value as a function of the content of the received data message.

31 Claims, 5 Drawing Sheets

APPARATUS AND METHOD FOR TRACKING AN ABNORMAL TIRE CONDITION

TECHNICAL FIELD

The present invention relates to tire condition sensing and, more particularly, to an apparatus and method for tracking the duration of an abnormal tire condition in a tire condition sensing system.

BACKGROUND OF THE INVENTION

Numerous tire pressure monitoring systems have been developed in order to detect when the air pressure within a tire drops below a threshold pressure value. A system typically includes a pressure switch, an internal power source, and a communications link. The pressure switch provides tire pressure information to a central receiver through the communications link. The communications link may be a wired or wireless link.

There has been an increasing need for tire pressure monitoring systems due to the use of "run flat" tires in vehicles. "Run flat" tires enable a driver to travel an extended distance after a substantial loss of air pressure within a vehicle tire.

Examples of tire condition monitoring systems which maintain information related to a detected tire condition are disclosed in U.S. Pat. Nos. 5,825,286, 5,754,965, 5,559,484, 5,731,754, 5,581,464, and 4,186,377.

SUMMARY OF THE INVENTION

One aspect of the present invention provides an apparatus for tracking an abnormal condition of a vehicle tire. The apparatus includes a receiver that receives a data message having data indicative of a condition of the vehicle tire. A controller is connected to the receiver and is responsive to the data message received by the receiver. The controller includes a counter that has a value indicative of a duration of an abnormal tire condition. The controller adjusts the counter value as a function of the content of the received data message.

Another aspect of the present invention provides an apparatus for tracking an abnormal condition of a vehicle tire. The apparatus includes a receiver for receiving a data message that includes data indicative of an operating mode of a transmitter module associated with the vehicle tire. The data message also includes data indicative of a condition of the associated vehicle tire. A controller is coupled to the receiver for determining an operating mode of the transmitter module based on the data message. The controller includes a counter having a value indicative of a duration of an abnormal condition for the associated vehicle tire. The controller, in response to receiving a data message indicating the abnormal tire condition, adjusts the counter value based on the operating mode data of the data message.

Still another aspect of the present invention provides a system for tracking an abnormal condition of a vehicle tire. The system includes a transmitter module having a tire condition sensor for sensing a condition of the associated vehicle tire and a transmitter for transmitting a data message having a characteristic indicative of the sensed condition. A receiver remote from the transmitter module receives the data message. A controller is connected to the receiver and responsive to the data message received by the receiver. The controller includes a counter having a value indicative of a duration of an abnormal tire condition. The controller adjusts the counter value as a function of the content of the data message.

Yet another aspect of the present invention provides a method for tracking an abnormal tire condition in a tire condition monitoring system. The method includes receiving a signal having a data message indicative of a condition of an associated vehicle tire. The method further includes the step of counting values indicative of a duration of an abnormal tire condition of the associated vehicle tire and adjusting the count value as a function of the content of the received data message.

BRIEF DESCRIPTION OF THE DRAWINGS

The foregoing and other features and advantages of the invention will become more apparent to one skilled in the art upon consideration of the following description and the accompanying drawings in which.

DESCRIPTION OF AN EXEMPLARY EMBODIMENT

Figure 1:
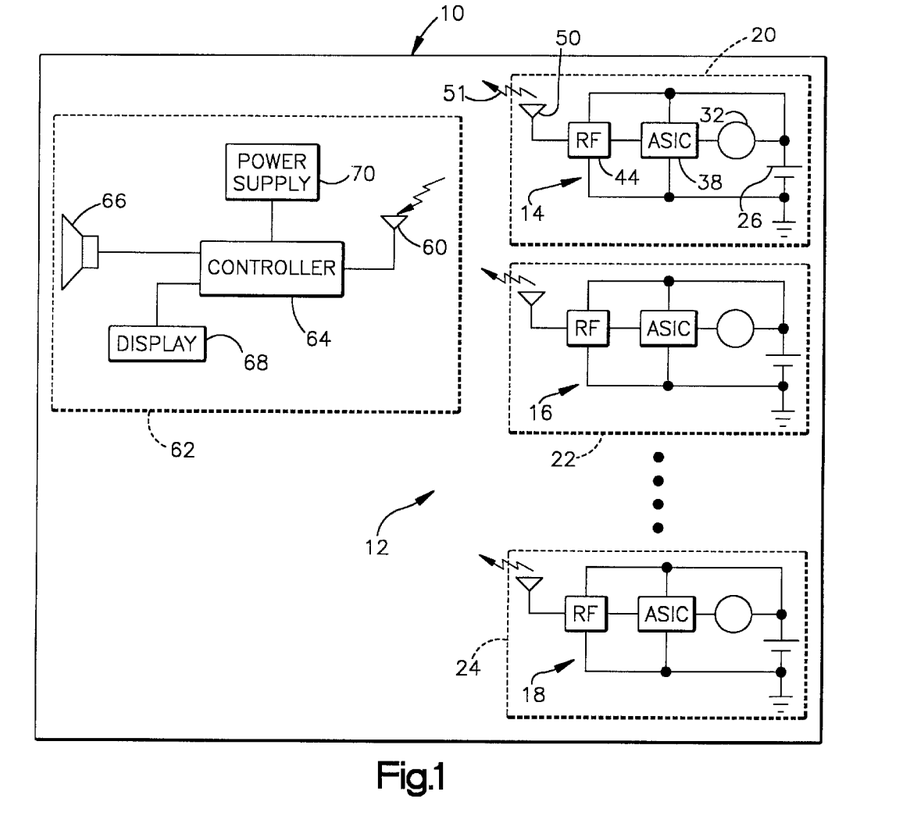
FIG. 1 is a schematic block diagram of a tire condition monitoring system in accordance with the present invention.

FIG. 1 schematically illustrates a vehicle 10 equipped with a tire condition monitoring system 12 in accordance with the present invention. The system 12 includes a plurality of tire condition sensor/transmitter modules 14, 16, and 18 for sensing one or more conditions of associated vehicle tires 20, 22, and 24, respectively. There is one module associated with each vehicle tire, including any spare tire(s) of the vehicle 10.

Each module 14, 16, 18 are similarly constructed. Therefore, for brevity, only the module 16 is described in detail it being understood that the others are similarly constructed. The module 14 includes a power supply 26 that supplies electrical energy to various circuit components of the module. In particular, the power supply 26 is electrically connected to a motion detector 32, a controller, such as an application specific integrated circuit (ASIC) 38, and to a radio frequency (RF) transmitter 44. The motion detector 32 provides a motion signal to its ASIC 38 having an electrical characteristic or state that indicates movement of its vehicle tire 20. The ASIC 38 has a plurality of operating modes responsive to the motion signal from the motion detector 32. The ASIC 38, in turn, controls the operation of the module 14 according to its current operating mode.

As described in greater detail below, the ASIC 38 includes one or more sensors operative to sense one or more respective conditions of its vehicle tire 20 and/or operating parameters of the module itself. The sensors provide sensor signals indicative of the condition sensed thereby. The ASIC 38 processes the sensor signals to determine desired tire condition data and/or module diagnostic information. The ASIC 38 provides tire condition data and/or diagnostic information to its corresponding transmitter 44. The transmitter 44, under the control of its ASIC 38, provides an encoded data message signal to an antenna 50 indicative of the data received from the ASIC. Any type encoding scheme may be used to convey digital data from each tire condition module 14, 16, 18 including, for example, frequency shift keying (FSK), binary phase shift keying (BPSK), pulse width encoding, differential phase shift keying (DPSK), or amplitude shift keying (ASK). The antenna 50 transmits or broadcasts the encoded data message as an RF signal through free space, indicated at 51. The data message may, for example, include an indication of tire condition, diagnostic information for its associated module, an identification ("ID") code of the module, and a tire ID code indicating the location of the module relative to the vehicle, etc. Each vehicle tire location will have an associated ID code.

The RF signal 51 is received at an antenna 60 of a receiver module 62. The receiver module 62 includes a controller 64 having circuitry or functionality that detects and decodes or demodulates the received signals. Alternatively, the receiver module 62 may include discrete receiver and decoder circuitry connected between the antenna 60 and the controller 64.

Preferably, the controller 64 is a microcontroller or microcomputer configured for receiving the tire condition data signals, decoding and processing the received signals, and providing an indication of the received tire condition information. For example, the controller 64 is electrically connected to a speaker 66 for, when appropriate, providing an audible indication, e.g., a warning signal, based on the information contained in the time condition and/or diagnostics data messages. Alternatively, or in addition to the speaker 66, the controller 64 is connected to a display 68 that provides a visual indication of the received tire condition and/or diagnostic information. The display 68, for example, may be an LED or LCD display of known configuration for displaying tire identification and detailed tire condition information (e.g., alphanumeric characters) for each vehicle tire as sensed by each of the tire condition modules 14, 16, 18. The display 68 could also display module diagnostic information.

The controller 64, the associated display 68, and speaker 66 are powered by a power supply 70. The power supply may be the output of a voltage regulator connected to a vehicle battery, such as when the receiver module 62 is mounted within the vehicle 10. The receiver module 62 alternatively may be powered by an internal power supply. It is also contemplated that the receiver module 62 may be a built-in system provided by a vehicle OEM or may be a hand-held, portable device or fob that a vehicle occupant or other individual may carry to obtain an audible and/or visual indication of the tire condition and/or diagnostic information.

While, in accordance with one exemplary embodiment of the present invention, the communications link between the modules 14, 16, and 18 and the receiver 62 is described as being an RF link, other wireless communication links, such as electromagnetic or optical, could be used.

Figure 2:
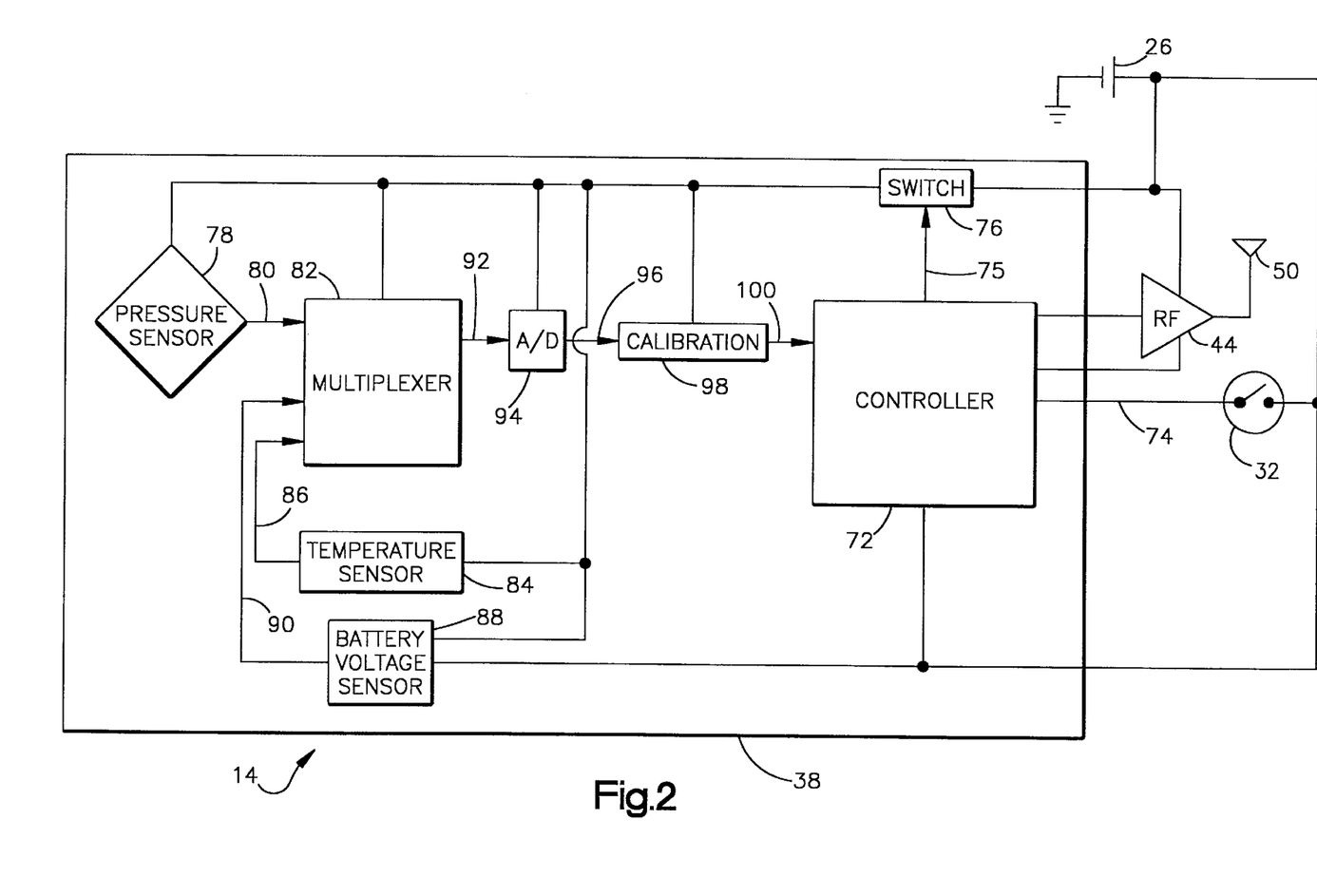
FIG. 2 is a detailed block diagram of a sensor module of the system of FIG. 1 in accordance with the present invention.

FIG. 2 illustrates a detailed block diagram of the tire condition sensor module 14 of FIG. 1 in accordance with an exemplary embodiment of the present invention. Identical reference numbers refer to parts of the module 14 previously identified with respect to FIG. 1. The sensor module 14, for example, is integrated in a single package, operating as a stand alone unit for use with the associated vehicle tire (e.g., 20 of FIG. 1).

The sensor module 14 includes sensor components that are operative to sense various conditions of the vehicle tire and/or to obtain diagnostic information of the module 14. In accordance with an exemplary embodiment of the present invention, the sensed tire conditions include tire pressure and temperature and the diagnostic information includes battery voltage. It should be understood that diagnostic information could also include information relating to the operativeness of the sensors themselves. It is also contemplated that other parameters of the tire and/or of the module also may be monitored in accordance with the present invention. The transmitter 44 of the module 14 broadcasts a data message signal indicative of the sensed parameters, such as in a serial data format, and diagnostic information for receipt by the central receiver (e.g., 62 of FIG. 1).

As used herein, including the appended claims, the phrases "tire condition," "tire condition sensor" and related terms and phrases are intended to encompass both sensed conditions (e.g., pressure, temperature) of a vehicle tire and diagnostic information (e.g., battery voltage) of the tire condition module associated with the vehicle tire.

Referring back to FIG. 2, as stated above, the motion detector 32 detects movement of the associated vehicle tire (e.g., 20 of FIG. 1), such as in response to tire rotation or vibration thereof. Specifically, the motion detector 32 is connected to a controller 72 of the ASIC 38 via connection 74. The motion detector 32 provides a signal to the controller 72 in response to the detected movement.

By way of example, the motion detector 32 is in the form of a normally open centrifugal switch that closes upon the associated vehicle tire 20 rotating at a predetermined rate. The centrifugal switch closes when the associated tire rotates at a rate corresponding to at least a predetermined vehicle speed, such as about 10 mph or greater. When the centrifugal switch is closed, it provides a motion signal to the controller 72, such as a logic HIGH signal at a predetermined voltage. The logic HIGH motion signal indicates that the associated vehicle tire (e.g., 20 of FIG. 1) is rotating at a rate corresponding to at least the predetermined vehicle speed. On the other hand, when the centrifugal switch is open, such as for vehicle speeds less than about 10 mph, a logic LOW motion signal of a predetermined voltage, e.g. zero volts, is provided to the controller 72 in a known manner such as by connecting that input of the controller to ground at 74 through a resistive load. The logic LOW motion signal indicates either the absence of vehicle movement or movement at a speed less than the predetermined vehicle speed.

The controller 72, for example, may be a microcontroller, a microprocessor, a state machine, discrete components, another ASIC or any combination thereof. The controller 72 controls operation of the module 14. The function of the controller 72 could be implemented as hardware and/or software.

The controller 72 sets an operating mode or state of the module 14 in response to the motion signal received over 74. The operating mode also may be responsive to other criteria, such as to one or more of the sensed tire conditions. For example, the controller 72 tracks the state of various flag conditions that vary based on monitored parameters, such as pressure, temperature, battery voltage, and motion of the associated vehicle tire. The controller 72 controls transitions between operating modes according to the particular value of each of the flag conditions. The controller 72 also controls the timing of tire condition measurements and the timing transmission of data messages according to its operating mode, which is based on such flag conditions.

The controller 72 has an output 75 connected to a control switch 76 for controlling activation of other components of the sensor module 14. In particular, the control switch 76 has an input electrically connected to the power supply 26, such as through an appropriate filter and/or voltage regulator (not shown). The switch 76 also has an output connected to various circuit components located within the ASIC 38. The circuit components could, in accordance with the present invention, be located external to the ASIC 38.

While, for purposes of brevity, a single switch 76 is illustrated as connecting all internal components to the power supply 26, the controller 72 alternatively could control each of the components through separate switches or an appropriate switching matrix. Such switches may be located external to the controller 72, such as shown with switch 76 in FIG. 2. Alternatively, one or more such switches could be integrated as part of the controller 72 so as to provide desired electrical energy to selected components.

All sensors can be incorporated into the ASIC 38 as shown in the example of FIG. 2 or selected ones of the sensors located internal to the ASIC. The ASIC 38 includes a pressure sensor 78 operative to sense tire pressure of the associated vehicle tire (e.g., 20 of FIG. 1). The pressure sensor 78 is connected to the switch 76 and provides a tire pressure signal 80 to one input of a multiplexer circuit 82 indicative of the sensed tire pressure. In particular, the pressure sensor 78 provides the tire pressure signal 80 when activated by the control switch 76. The pressure sensor 78, for example, may be an analog pressure sensing device, such as a Wheatstone bridge. The pressure sensor 78 provides a signal having an electrical characteristic (e.g., a voltage differential) indicating an absolute relative pressure detected by the sensor 78. The pressure sensor 78 is capable of sensing pressure within a range, for example, from about 50 kpa to about 640 kpa over a wide temperature range.

A temperature sensor 84 also is also part of the ASIC 38 and is connected to the switch 76 and to an input of the multiplexer circuit 82. The temperature sensor 84 provides a signal 86 to the multiplexer circuit 82 having an electrical characteristic indicative of the sensed temperature of the associated vehicle tire. The controller 72 controls operation of the temperature sensor 84 through activation of the control switch 76.

A battery voltage sensor 88 is electrically connected between the internal power supply 26 and an input of the multiplexer circuit 82. The voltage sensor 88 samples the voltage of the power supply 26 upon the controller 72 activating the control switch 76. The voltage sensor 88 provides a battery voltage signal 90 to the multiplexer circuit 82 having an electrical characteristic indicative of the sensed voltage. The value of the battery voltage signal 90 after each broadcast provides a good indication of the electrical energy available in the power supply 26.

The multiplexer circuit 82, thus, receives parallel input signals 80, 86, and 90 from the respective sensing components 78, 84 and 88. The multiplexer circuit 82, in turn, provides a multiplexed serial output signal 92, indicative of the sensed parameters from each of the sensors 78, 84, and 88. The controller 72 also could be connected to the multiplexer circuit 82 to further control the multiplexing function thereof. The multiplexed data signal 92 is provided to an analog-to-digital converter ("A/D") 94. The A/D converter 94 provides a digitized output signal 96 to a calibration function 98. Alternatively, the signals from the sensors 78, 84, and 88 could be digitized prior to being provided to the multiplexer circuit 82 and multiplexer circuit 82 would be a digital multiplexer.

The calibration function 98, which may be hardware and/or software, is configured to de-multiplex the digitized data signal 96 received from the A/D 94 and calibrate the data into a readable format for the controller 72. For example, the calibration function 98 may include a plurality of pressure curves, temperature curves and/or look-up tables from which calibrated temperature and pressure values are determined based on the information contained in the digitized data signal 96. The look-up table and curves are derived from empirical data over wide ranges of temperature and pressure for the particular pressure and temperature sensors 78 and 84 being used. The calibration function 98 also includes a look-up table for converting the digitized voltage signal 90 into a calibrated voltage value in a useable digital format for the controller 72.

The calibration function 98 provides a calibrated output signal 100 to another input of the controller 72. The signal 100 has a characteristic or value indicative of each of the sensed parameters, e.g., pressure, temperature, and battery voltage. The controller 72 receives the calibrated data signal 100 and stores at least some of the received data in appropriate memory (not shown). The memory can be either internal or external to the controller 72.

The controller 72 also is programmed with a unique identification (ID) code for the module 14 and, optionally, may include a tire ID code. The transmitter ID code is set during manufacture and is used during transmissions to provide tire location. The tire ID code, for example, may be set at the factory or by a technician who installs the module to indicate the tire and module location relative to the vehicle.

The controller 72 is electrically connected with the RF transmitter 44 for controlling transmissions of the data message through the associated antenna 50. The broadcast of the data message signal occurs at selected times based on the particular operating mode of the ASIC 38. As mentioned above, the controller 72 determines the operating mode of the ASIC 38 in response to both the motion signal received over connection 74 and/or in response to the sensed parameters indicated by the calibrated output signal 100.

The controller 72 has a first operating mode, 5 hereinafter referred to as the normal operating mode, in response to the motion signal indicating at least a predetermined rate of rotation of the associated vehicle tire, i.e., the centrifugal switch 32 is closed when the vehicle is being driven. In the normal operating mode, for example, the controller 72 controls the switch 76 to effect periodic activation of the tire condition sensors 78, 84 and diagnostic sensor 88 as well as the other circuit components 82, 94 and 98 of the ASIC 38. Accordingly, sensors 78 and 84 periodically sense the tire condition of the associated vehicle tire at a predetermined rate, such as about once every four to ten seconds. The diagnostic sensor 88 is similarly periodically sensed at this same rate.

Also, in the normal operating mode, the controller 72 controls the RF transmitter 44 to broadcast the data message signal. The broadcast of each data message signal occurs intermittently at random time intervals, such as, for example, ranging between about three to about eight minutes. The accuracy of the transmission rates will vary according to the accuracy of the clock located in the controller 72 of the tire condition module 14. In any event, an average rate of transmissions in the normal mode can usually be determined so that a reasonable representation of transmission frequency can be determined at the receiver (e.g., 62 of FIG. 1). In this exemplary embodiment (FIG. 2), the average transmission rate in the normal mode is once about every five minutes.

When the centrifugal switch 32 is open, thereby indicating rotation of the vehicle tire at a rate corresponding to less than a predetermined vehicle speed, the controller 72 controls the sensor module 14 to operate in a second, different operating mode. The second operating mode is referred to as a sleep mode.

In the sleep mode, the controller 72 controls the switch 76 to activate each of the tire condition sensors 78, 84, and the diagnostic sensor 88 so as to sense their respective parameters at a periodic rate that is substantially slower than the rate at which corresponding tire conditions are sensed when in the normal operating mode. The sensing rate in the sleep mode also depends on the accuracy of the clocking function of tire condition module 14. In the sleep mode, for example, the sensors 78, 84, and 88 are controlled to sense their associated conditions from about every ten minutes to as high as about forty-five minutes.

However, rather than intermittently broadcasting at random time intervals, as in the normal operating mode, the tire condition data signal is broadcast in the sleep mode only after one or more of the sensed tire or diagnostic conditions is determined to be below an associated predetermined threshold. For example, when in the sleep mode, the controller 72 controls the transmitter 44 to broadcast the tire condition data signal only after first determining that the sensed tire pressure is below a predetermined threshold, such as about 220 kpa or about 18 psi. The broadcasting alternatively could be based on a determination that the sensed temperature is at or above some predetermined level or that the sensed battery voltage is below a voltage threshold.

Assuming that, for purposes of explanation, the sensed pressure is below the pressure threshold, the controller 72 controls the transmitter 44 to transmit at about the same rate as the pressure is being sensed, e.g., from about ten minutes to about forty-five minutes. For purposes of simplification of explanation, will be assumed that the average rate of transmission while in the sleep mode is about every fifteen minutes.

The sleep mode helps to conserve the energy of the internal power supply 26 when the vehicle is parked or otherwise not being used. The sleep mode advantageously still provides for relatively frequent measurements of the tire condition so that upon determining the occurrence of, for example, a low tire pressure condition, this information is provided to the driver upon starting the vehicle as key-on-status information. The restricted broadcasts in the sleep mode further help to reduce interference with other RF communication links of the vehicle, such as a remote keyless entry system, that typically occur when the vehicle is stationary. Other operating modes also may be used to control the frequency of parameter measurements as well as transmission of the data message signals.

Figure 3:
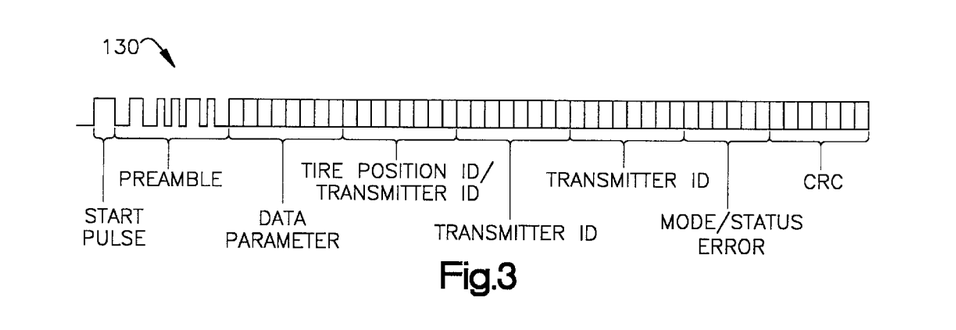
FIG. 3 is a representation of a data message.

By way of example, FIG. 3 illustrates a functional example of a data packet 130 transmitted by the transmitter 44 under control of the module 14. Typically, several data packets form each data message and different data packets may contain different aspects of tire condition or diagnostic information. Each data packet 130 is formed of a plurality of data bits that contain selected data. In this example, starting from the left side of FIG. 3, the data packet 130 includes a start pulse followed by a preamble that contains synchronization information for the data packet. Next, the data packet contains calibrated data parameter information indicative of one or more of the sensed parameters, including temperature, battery voltage, and/or pressure. The data parameter information also contains data indicating the type of calibrated data being indicated in the data packet.

Next, the data packet 130 contains data corresponding to the transmitter ID code and optionally the tire position ID code. For example, the tire position ID code may comprise three bits while the transmitter ID code may comprise 19 bits. Following the ID code information, the data packet 130 includes data bits indicating the current operating mode of the tire module (e.g., normal mode or sleep mode). In addition, data bits are provided to indicate the sensed tire condition information. The tire condition information may, for example, indicate temperature, such as whether the sensed temperature is normal, invalid, a low temperature, or a high temperature. The tire condition information also might indicate whether the tire pressure is above or less than a predetermined threshold, such as a pressure alert status. Error bits also may be provided for indicating a low battery condition or other internal errors detected by the controller at the sensor module. A cyclic redundancy check (CRC) of the proceeding data also is provided in the data packet 130 for error detection.

Figure 4:
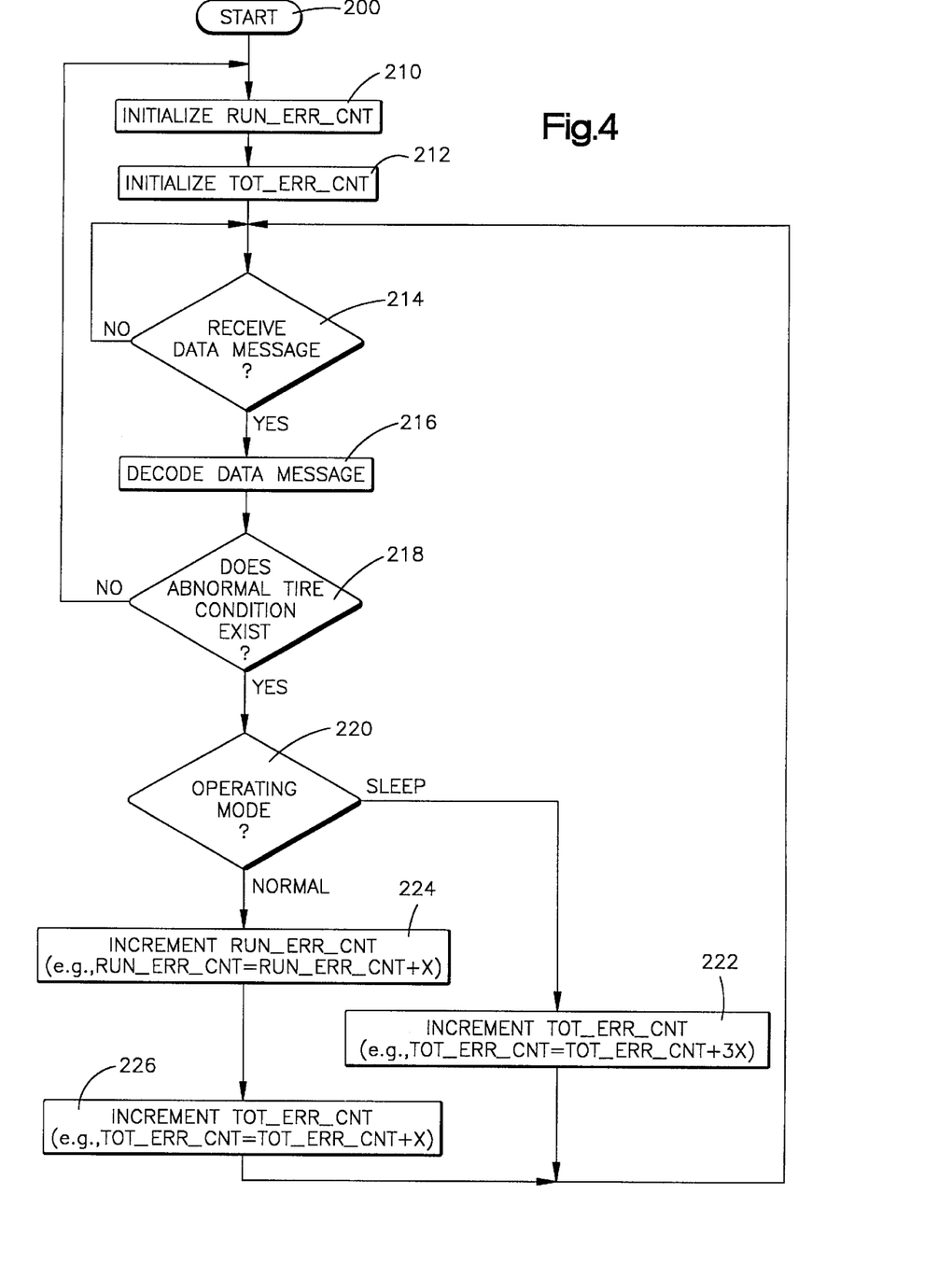
FIG. 4 is flow diagram illustrating the internal operation of the controller of FIG. 1 in accordance with one exemplary embodiment of the present invention.
Figure 5A:
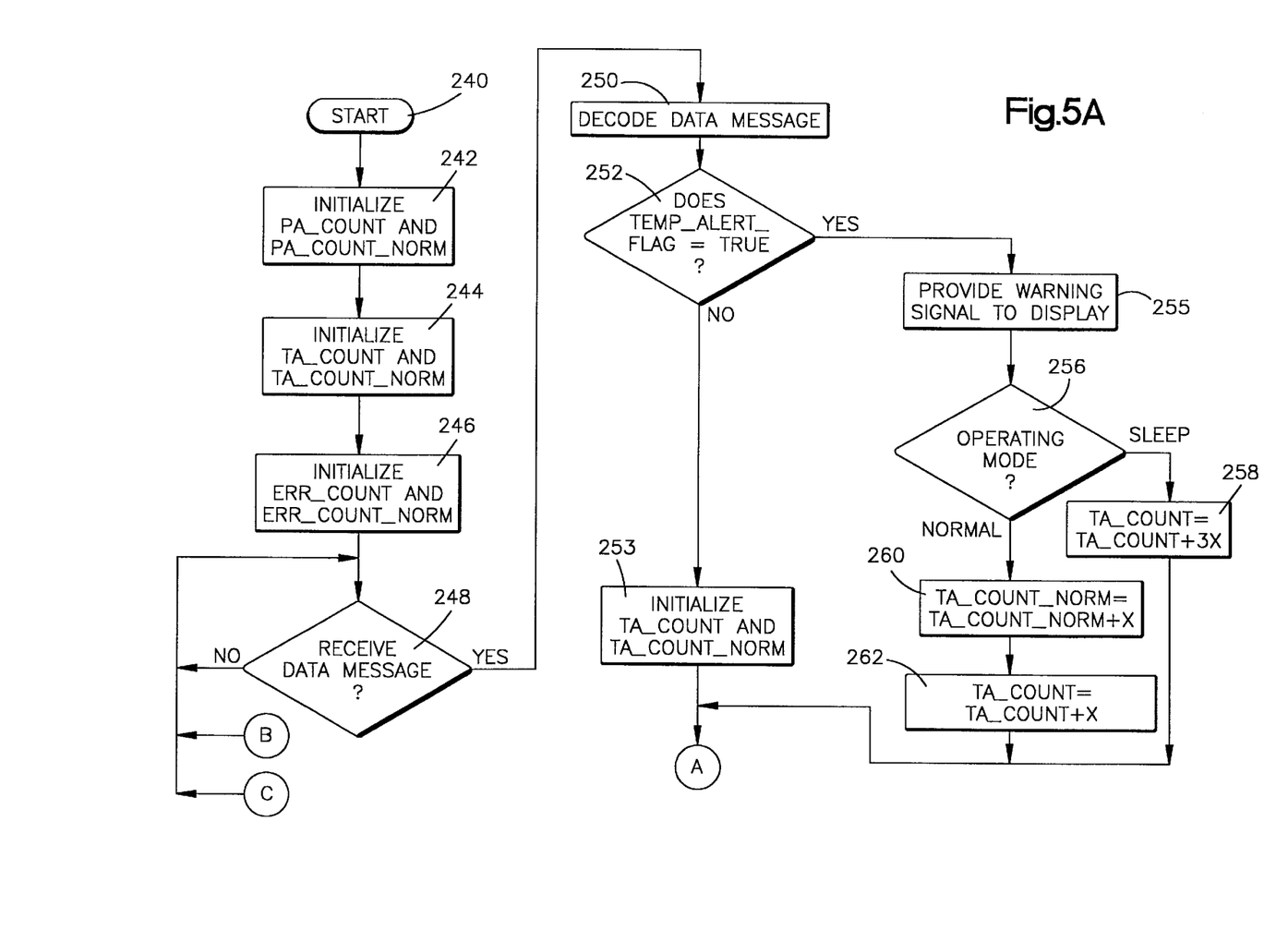
FIGS. 5A and 5B combine to illustrate a flow diagram for the internal operation of the controller of FIG. 1 in accordance with another exemplary embodiment of the present invention.
Figure 5B:
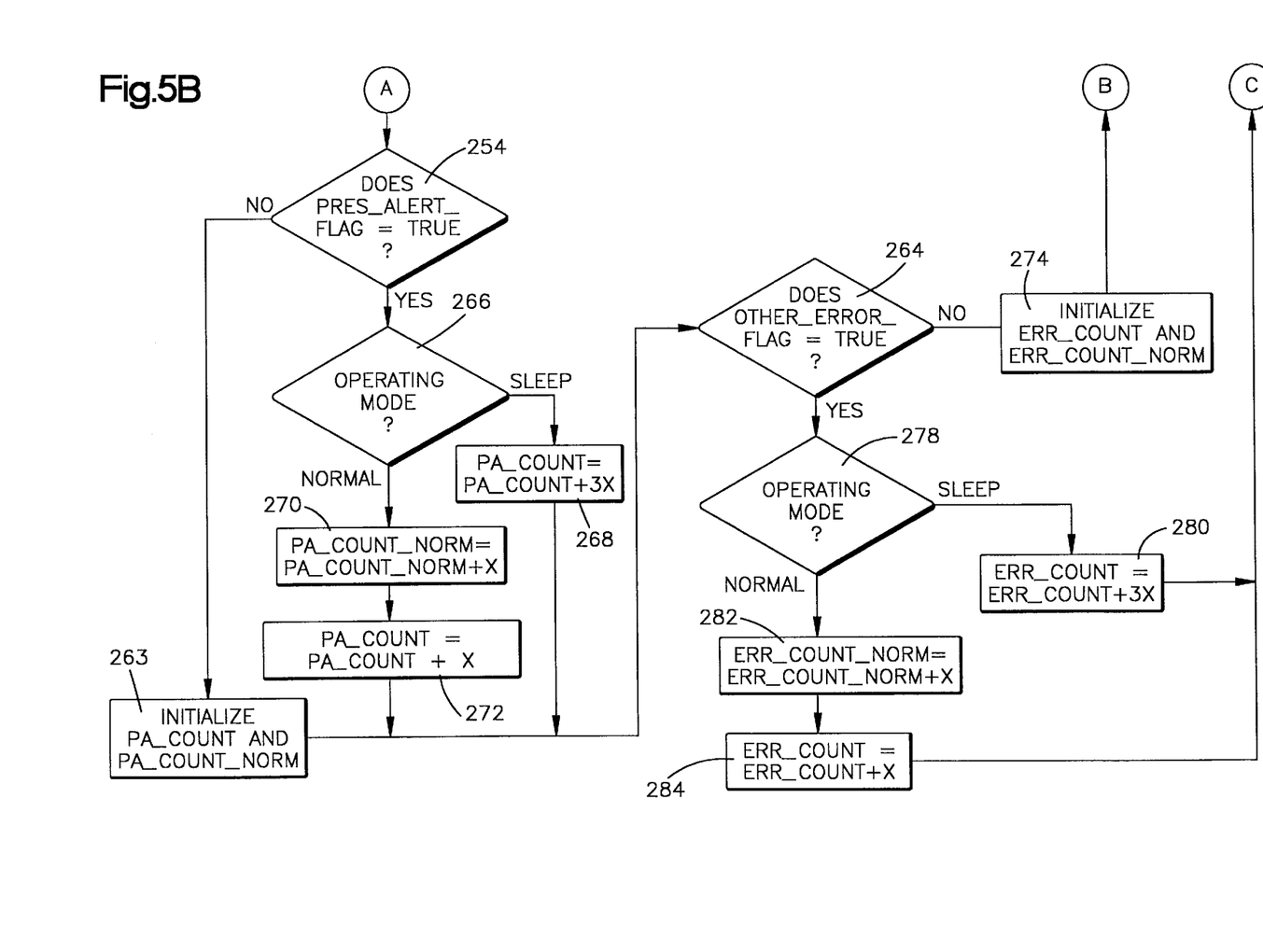

In view of the foregoing structure described above, the operation of the tire condition monitoring system will be better appreciated with reference to flow diagrams shown in FIGS. 4, 5A, and 5B. These flow diagrams represent a series of operational steps performed internally within the controller 64 of the receiver module 62. In particular, the steps shown illustrate exemplary embodiments of how various abnormal tire conditions as monitored. While the operation is illustrated as a series of steps in FIGS. 4–5B, such operation could be implemented as being state dependent in response to detecting various flag conditions in received data. Additionally, while the exemplary embodiment describes such steps as being performed by software in a microcomputer, the steps implemented in the controller 64 could be implemented as hardware or a combination of hardware and software.

Referring to FIG. 4, the tire condition tracking process begins at step 200 in which flag conditions are set to their starting values and appropriate parameters are initialized. The process proceeds to step 210 in which a run error counter ("RUN_ERR_CNT") is initialized, i.e., reset to a starting value such as zero. The run error counter tracks the duration of a detected abnormal tire condition for a tire condition module of an associated one of the vehicle tires while the associated tire condition module is in the normal operating mode.

From step 210, the process proceeds to step 212 in which a total error counter ("TOT_ERR_CNT") is initialized. The total error counter tracks the total duration of the abnormal tire condition, including during both the sleep operating mode and the normal operating mode. The process then proceeds to step 214.

At step 214, a determination is made as to whether a data message is received. If the determination at step 214 is negative, indicating that no message is received, the process simply loops back to step 214 to await receipt of a data message. If a data message is received, the process proceeds to step 216 in which the received data message is decoded.

As mentioned above, the data message includes an indication as to the operating mode of the tire condition module that transmitted the data message. The data message also contains an indication of the tire condition sensed by the tire condition sensor (e.g., 78, 84) and diagnostics sensed by a diagnostic sensor (e.g., 88). The data message also preferably contains an indication, such as a status error flag condition, as to whether any of the sensed tire conditions is abnormal relative to a corresponding threshold. The decoding step, for example, includes demodulating and converting the received signal into a useable digital signal, such as in the form of the data packet format shown in FIG. 3. This enables the controller (e.g., 64 of the receiver module 62 shown in FIG. 1) to extract and evaluate the information contained in the data message.

From step 216 (FIG. 4), the process proceeds to step 218 in which a determination is made as to whether an abnormal tire or diagnostic condition exists. As mentioned above, this determination may be based on detecting a TRUE condition in an abnormal tire condition flag of the data message. Alternatively, the tire condition data, such as temperature or pressure or diagnostic condition such as battery voltage, may be evaluated and compared against associated threshold values stored in memory of the receiver module. If the content of the data message does not indicate that an abnormal tire condition exists, the process returns to step 210. If the determination at step 218 is affirmative, indicating that the content of the data message indicates that an abnormal tire condition exists, the process proceeds to step 220.

At step 220, the operating mode of the tire condition module is determined from the data message. In this exemplary embodiment, there are two operating modes, namely, the normal operating mode and sleep operating mode. The operating mode data of the data message is set at the tire condition module (e.g., 14, of FIG. 2) based on the signal from the motion detector (e.g., 32 of FIG. 2). The operating mode data enables the receiver to determine and, in accordance with one aspect of the present invention, track whether the vehicle is being driven when the data message is transmitted. Other operating modes, in addition to the sleep and normal operating modes, also could be used in accordance with present invention.

If the data message indicates that the tire condition module is in the sleep operating mode, the process proceeds to step 222. At step 222, the total error counter (TOT_ERR_CNT) associated with the tire identified as having the error is incremented. Each tire will have its own total error counter. By way of example, the total error counter may be incremented by an amount 3X, where X is a preselected counter value and the constant 3 is selected based on a ratio of the average transmission rate in the sleep mode to the average transmission rate in the normal mode. From step 222, the process returns to step 214 for receiving another data message from any of the tire condition modules.

If, at step 220, the controller of the receiver module determines from the data message that the tire condition module is in the normal operating mode, the process proceeds to step 224. At step 224, the run error counter (RUN_ERR_CNT) associated with the tire identified as having the error is incremented. For example, the run error counter may be incremented by an amount X, where X has the same value as X described with respect to step 222. For example, X=1. From step 224, the process proceeds to step 226. At step 226, the total error counter (TOT_ERR_CNT) is incremented indicating a total time lapse of the existence of any error condition, whether tire or diagnostic, for that vehicle.

In this example, the total error counter also is incremented by the amount X. Accordingly, the total error counter is incremented by different amounts (e.g., X or 3X) depending upon whether the data message indicates the tire condition module is in the sleep operating mode or the normal operating mode. Similarly, the run error counter is incremented only when the operating mode data of the data message indicates that the tire condition module is in the normal operating mode and an abnormal tire condition has been detected. The run error counter, thus, provides a representation of the duration of an abnormal tire condition or with a diagnostic error while the tire condition module is in the normal operating mode. That is, the run error counter indicates how long the vehicle is being driven with the abnormal tire condition or with a diagnostic error. From step 226, the process returns to step 214.

For so long as an abnormal tire condition exists, each data message received from the tire condition module operates as a clock pulse that increments a corresponding error counter in the remote receiver. The operating mode data contained within the data message indicates an amount by which the total error counter will be incremented. The amount of increment is selected based on, for example, the relative average transmission rates of the transmitter in each of the modes. The operating mode data also indicates whether the run error counter will be incremented at all.

The time period of an abnormal tire condition is determined from each of the counter values. This determination is made, for example, by correlating each counter value with a time value that corresponds to the average transmission rate of the tire condition module in the normal mode. In the exemplary embodiment described above, the average transmission rate in the normal operating mode is 5 minutes and the average value for transmitting in the sleep operating mode during an abnormal tire condition is about 15 minutes. Therefore, in this example, each counter value X (e.g., 1) corresponds to about 5 minutes.

Another exemplary embodiment of the tire and diagnostic tracking process is illustrated in FIGS. 5A and 5B. This exemplary embodiment illustrates some specific counter values that may be used by the receiving module 62 in accordance with the present invention. The process begins at step 240 (FIG. 5A) in which flag conditions are set to appropriate starting values and other parameters are initialized. The process proceeds to step 242 in which pressure alert counters (PA_COUNT and PA_COUNT_NORM) are initialized to their starting values, such as zero.

The process proceeds to step 244 in which the temperature alert counters (TA_COUNT and TA_COUNT_NORM) are initialized to their starting values. The process then proceeds to step 246 in which other error counters (ERR_COUNT and ERR_COUNT_NORM) also are initialized to their starting values. From step 246, the process proceeds to step 248.

At step 248, a determination is made as to whether a data message has been received at the receiver of the receiver module (62 of FIG. 1). If no data message is received, the process remains in a loop (i.e., repeats step 248) in which it awaits a data message from one of its associated tire condition modules (e.g., 14, 16, 18 of FIG. 1). If the receiver module 62 receives a data message, the process proceeds to step 250.

At step 250, the received data message is appropriately decoded, such as at the controller (e.g., 64 of FIG. 1). This includes, for example, demodulating the received RF signal from one of its associated tire condition modules and converting it into appropriate digital data, such as the data format illustrated in FIG. 3. The process then proceeds to step 252.

At step 252, a determination is made whether a temperature alert flag (TEMP_ALERT_FLAG) condition is TRUE. This determination may be made at the tire condition module 14 and transmitted as a temperature alert flag in the data message. Alternatively, the determination may be made at the receiver module 62 by determining if a temperature value provided by the tire condition data exceeds a temperature threshold value stored in the memory of the receiver module 62.

If the determination at step 252 is negative, the process proceeds to step 253. At step 253, the temperature alert counters (TA_COUNT and TA_COUNT_NORM) are initialized or reset back to its initial value set in step 244. From step 253, the process proceeds to step 254 (FIG. 5B). On the other hand, if the determination at step 252 (FIG. 5A) is affirmative, indicating that the data message contains data indicating that the sensed temperature of an associated tire exceeds a temperature threshold, the process proceeds to step 255 at which a warning signal is provided.

At step 256, the operating mode of the tire condition module is determined. This determination is made based on operating mode data contained in the received data message. If the operating mode data indicates a sleep operating mode, the process proceeds to step 258. At step 258, the temperature alert counter (TA_COUNT) is incremented. In this example, the temperature alert counter is incremented by an amount 3X. As stated with respect to FIG. 4, the value of X is based on a ratio of the average transmission rates during the normal and sleep operating modes. From step 258, the process proceeds to step 254 (FIG. 5B).

If, at step 256 (FIG. 5A), it is determined that the tire condition module is in the normal operating mode, the process proceeds to step 260. At step 260, the normal mode temperature alert counter (TA_COUNT_NORM) is incremented. In this example, the normal mode temperature alert counter is incremented by an amount X. In this way, each increment of the normal mode temperature alert counter corresponds to the duration of the average rate of transmissions by the tire condition module while in the normal operating mode (e.g., about 5 minutes). From step 260, the process proceeds to step 262 in which the temperature alert counter (TA_COUNT) is incremented by an amount X. In this way, the receiver module is able to track the duration of abnormal temperature conditions at an associated vehicle tire as a function of the content of the data message. The process then proceeds to step 254 (FIG. 5B).

At step 254, a determination is made as to whether the pressure alert flag condition (PRES_ALERT_FLAG) is TRUE. This determination is made based on data contained within the received data message. For example, the tire condition module may transmit the data message having pressure alert flag data indicating whether the tire condition module has detected an abnormal pressure condition of the associated vehicle tire. Alternatively, the receiver module may determine that the tire pressure data contained within the data message indicates a pressure value that is less than or greater than a predetermined pressure value.

If the determination at step 254 is negative, indicating that the pressure alert flag is FALSE, the process proceeds to step 263. At step 263, the pressure alert counters (PA_COUNT and PA_COUNT_NORM) are initialized or reset to initial values set in step 212. From step 263, the process advances to step 264.

If, at step 254, the pressure alert flag condition is determined to be TRUE, the process proceeds to step 266. At step 266, the operating mode of the tire condition module is determined based on the received data message. In response to determining that the tire condition module is in the sleep operating mode, the process proceeds to step 268.

At step 268, the pressure alert counter (PA_COUNT) is incremented, such as by an amount 3X. From step 268, the process proceeds to step 264. On the other hand, in response to determining (step 266) that the tire condition module is in the normal operating mode, the process proceeds to step 270. At step 270, the normal mode pressure alert counter (PA_COUNT_NORM) is incremented, such as by an amount X. From step 270, the process proceeds to step 272 in which the pressure alert counter (PA_COUNT) is incremented also by the amount X. In this way, the receiver module may track the duration of an abnormal pressure condition of an associated vehicle tire while in the normal operating mode (e.g., using PA_COUNT_NORM) and the duration of an abnormal tire pressure condition more generally (e.g., using PA_COUNT). The normal mode pressure alert counter, thus, provides an indication of how long an abnormal pressure condition exists while the vehicle is being driven. From step 272, the process proceeds to step 264.

At step 264, a determination is made as to whether another error flag condition (OTHER_ERROR_FLAG) is TRUE. By way of example, such a flag condition may represent an occurrence of a low battery condition in an associated tire condition module, that a tire condition module is experiencing an excessive amount of vibration, such as from being out of balance, or other conditions that could be sensed by the module (e.g., 14, 16, 18 of FIG. 1). In the event that the determination in step 264 is negative, indicating that the other error flag condition is FALSE, the process proceeds to step 274 in which the error counters (ERR_COUNT and ERR_COUNT_NORM) are initialized. From step 274, the process returns to step 248 (FIG. 5A).

In the event that the determination at step 264 (FIG. 5B) is affirmative, indicating that the other error flag condition is TRUE, the process proceeds to step 278. At step 278, the operating mode of the tire condition module is determined from the content of the received data message. In response to determining that the tire condition module is in the sleep operating mode, the process proceeds to step 280. At step 280, the error counter value (ERR_COUNT) is incremented, such as by an amount 3X. From step 280, the process returns to step 248 (FIG. 5A) to await receipt of a next data message.

In response to determining that the tire condition module is in the normal operating mode at step 278 (FIG. 5B), the process proceeds to step 282. At step 282, the value of the normal mode error counter (ERR_COUNT_NORM) is incremented, such as by a value X. The process then proceeds to step 284 in which the error counter (ERR_COUNT) also is incremented by an amount X. Accordingly, the receiver is able to track the duration of such other abnormal conditions detected in an associated tire condition module by incrementing error counters based on the content of the received data message. From step 284, the process returns to step 248 (FIG. 5A) for receiving another data message from an associated transmitter module.

The exemplary processes represented in FIG. 4 and FIGS. 5A and 5B illustrate two embodiments, in accordance with the present invention, for tracking the duration of selected abnormal tire conditions. This is accomplished by the controller 64 of the receiver module 62 adjusting the value of appropriate counters as a function of the content of a received data message, which is transmitted by a tire condition module 14, 16, 18. In each exemplary situation described above, the received data message 130 operates as a clock pulse for each counter. That is, provided that a corresponding abnormal tire condition exists, a received data message causes one or more counters to be incremented a selected amount. In accordance with the exemplary embodiment of FIGS. 4, 5A and 5B, each counter is incremented an amount that varies as a function of the operating mode data and the tire condition data contained in the received data message.

This further enables the receiver module to efficiently track the duration of various abnormal tire conditions of an associated vehicle tire and module diagnostics while in the normal mode. In this way, each normal mode counter provides a representation of how long an abnormal pressure condition exists while the vehicle is being driven.

From the above description of the invention, those skilled in the art will perceive improvements, changes and modifications. For example, the amount each counter should be incremented will depend upon the particular implementation being used for the system. Such improvements, changes and modifications within the skill of the art are intended to be covered by the appended claims.

Having described the invention, the following is claimed:

1. An apparatus for tracking an abnormal condition of an associated vehicle tire, said apparatus comprising:
    a receiver receives a data message having data indicative of a condition of a vehicle tire; and
    a controller connected to said receiver and responsive to said data message received by said receiver, said controller including a counter having a value indicative of a duration of an abnormal tire condition of the vehicle tire, said controller adjusting said counter value as a function of the content of said data message received by said receiver.

2. An apparatus as set forth in claim 1 wherein said data message includes data indicative of an operating mode of a transmitter module associated with the vehicle tire, said controller adjusting said counter value an amount functionally related to the operating mode data of said data message.

3. An apparatus as set forth in claim 2 wherein the transmitter module has at least two operating modes, said controller adjusting said counter value by a first amount when the operating mode data indicates the transmitter module is in a first of the at least two operating modes.

4. An apparatus as set forth in claim 3 wherein said controller includes means for adjusting said counter value by a second amount, which is different from the first amount, when the operating mode data indicates the transmitter module is in a second of the at least two operating modes.

5. An apparatus as set forth in claim 4 wherein the first amount has a value greater than zero and the second amount is zero.

6. An apparatus as set forth in claim 3 wherein said controller increments said counter value only when said operating mode data has a value indicating that the transmitter module is in the first operating mode of the at least two operating modes, said counter value indicating the duration of the abnormal tire condition while in the first operating mode of the at least two operating modes.

7. An apparatus as set forth in claim 3 wherein a data message is transmitted by the transmitter module more often when the module is in the first operating mode than when in a second operating mode, said controller including means for incrementing said counter value only when the operating mode data indicates that the transmitter module is in the first operating mode, whereby the counter value indicates the duration of an abnormal tire condition while the tire transmitter module is in the first operating mode.

8. An apparatus as set forth in claim 7 wherein the abnormal tire condition is an abnormal pressure condition of the vehicle tire, said counter value providing an indication of the duration of the abnormal pressure condition of the vehicle tire while the transmitter module is in the first operating mode.

9. An apparatus as set forth in claim 7 wherein the abnormal tire condition is an abnormal temperature condition of the vehicle tire, said counter value providing an indication of the duration of the abnormal temperature condition of the vehicle tire while the tire transmitter module is in the one operating mode.

10. An apparatus as set forth in claim 7 wherein the abnormal tire condition is at least one of an abnormal pressure condition and an abnormal temperature condition of the vehicle tire, said counter further including a count value indicative of the duration of said at least one of an abnormal pressure condition and an abnormal temperature condition.

11. An apparatus for tracking an abnormal condition of a vehicle tire, said apparatus comprising:
    a receiver for receiving a data message that includes data indicative of an operating mode of a transmitter module associated with a vehicle tire, said data message also including data indicative of a condition of the associated vehicle tire; and
    a controller coupled to said receiver for determining an operating mode of the transmitter module from the data message, said controller including a counter having a value indicative of a duration of an abnormal condition, of the associated vehicle tire, said controller, in response to receiving a data message having tire condition data indicating the abnormal tire condition, adjusting said counter value based on the operating mode data of the data message.

12. An apparatus as set forth in claim 11 in a tire condition monitoring system wherein said transmitter module is mountable at the associated vehicle tire, said transmitter module being operative to transmit said data message at a rate functionally related to a detected condition of the associated vehicle tire.

13. A system as set forth in claim 12 wherein said transmitter module has at least two operating modes, said controller adjusting said counter value by a first amount when said operating mode data indicates said transmitter module is in a first of the at least two operating modes and adjusting said counter value by a second amount, which is different from the first amount, when the operating mode data indicates the transmitter module is in a second of the at least two operating modes.

14. A system as set forth in claim 13 wherein the first amount is greater than zero and the second amount is equal to zero.

15. A system as set forth in claim 13 wherein said transmitter module transmits the data message more frequently when said transmitter module is in the first operating mode than when in the second operating mode, said controller adjusting said counter value only if said data message indicates that said transmitter module is in the first operating mode and said tire condition data of said data message indicates an abnormal tire condition, such that said counter value indicates the duration of an abnormal tire condition while said tire transmitter module is in the first operating mode.

16. A system as set forth in claim 11 wherein the abnormal tire condition is an abnormal tire pressure condition of the vehicle tire, said counter value providing an indication of the duration of the abnormal pressure condition.

17. A system as set forth in claim 11 wherein the abnormal tire condition is an abnormal temperature condition of the vehicle tire, said counter value providing an indication of the duration of the abnormal temperature condition.

18. A system for tracking an abnormal condition of a vehicle tire, said system comprising:
   a transmitter module having a tire condition sensor for sensing a condition of at least one of an associated vehicle tire and said transmitter module, said transmitter module including a transmitter for transmitting a data message indicative of the sensed condition;
   a receiver remote from said transmitter module for receiving said data message; and
   a controller connected to said receiver and responsive to said data message received by said receiver, said controller including a counter having a value indicative of a duration of an abnormal condition, said controller adjusting said counter value as a function of the content of said data message.

19. A system as set forth in claim 18 wherein said transmitter module has at least two operating modes, said data message including operating mode data indicative of the operating mode of said transmitter module, said controller adjusting said counter value by a first amount when the operating mode data indicates that said transmitter module is in a first of the at least two operating modes.

20. A system as set forth in claim 19 wherein said tire condition sensor is a pressure sensor for sensing a pressure condition of the associated vehicle tire, said data message having pressure data indicating a pressure condition of the associated vehicle tire, said counter including a pressure count value indicative of the duration of an abnormal pressure condition of the associated vehicle tire.

21. An apparatus as set forth in claim 19 wherein said tire condition sensor is a temperature sensor for sensing temperature of the associated vehicle tire, said data message having temperature data indicating a temperature condition of the associated vehicle tire, said counter including a temperature count value indicative of the duration of an abnormal temperature condition of the associated vehicle tire.

22. A system as set forth in claim 19 further including a plurality of transmitter modules, each of said plurality of transmitter modules being located at an associated vehicle tire, each of said plurality of transmitter modules including a tire condition sensor for sensing a condition of at least one of an associated vehicle tire and an associated one of said plurality of transmitter modules, each of said plurality of transmitter modules including a transmitter for transmitting a data message having a data indicative the condition sensed by a respective one of said tire condition sensors, said receiver receiving data messages transmitted from each of said plurality of transmitter modules, said controller including a counter for said plurality of transmitter modules, each of said counters having a value indicative of a duration of an abnormal condition sensed at said plurality of transmitter modules, said controller adjusting said counter value of each associated one of said counters as a function of the content of said data message received from the each respective associated one of said plurality of transmitter modules.

23. A system as set forth in claim 22 wherein the data message from each of said plurality of transmitter modules includes data indicative of an operating mode of the respective transmitter module, said controller adjusting said counter value of each associated one of said counters based on the operating mode data of said data message received from each respective associated one of said plurality of transmitter modules.

24. A system for tracking an abnormal condition of a vehicle tire, said system comprising:
   means for detecting a condition of an associated vehicle tire and transmitting a data message indicative thereof;
   means for receiving the data message; and
   means responsive to the received data message for adjusting a counter value as a function of the content of said data message, said counter value indicating a duration of an abnormal tire condition.

25. A method for tracking an abnormal tire condition in a tire condition monitoring system, said method comprising the steps of:
   receiving a signal having a data message indicative of a condition of an associated vehicle tire;
   counting a value indicative of a duration of an abnormal tire condition of the associated vehicle tire; and
   adjusting the counted value as a function of the content of the received data message.

26. A method as set forth in claim 25 further including the step of determining whether the received data message indicates an occurrence of an abnormal tire condition, and wherein the step of adjusting the counted value is in response to determining that the abnormal tire condition exists.

27. A method as set forth in claim 26 wherein the data message includes data indicative of an operating mode of a transmitter module associated with the vehicle tire, and wherein the step of adjusting the counted value is based on the operating mode data of the data message.

28. A method as set forth in claim 27 wherein the transmitter module has at least two operating modes, said step of adjusting further including adjusting the counter value by a first amount when the operating mode data indicates the transmitter module is in a first of the at least two operating modes and adjusting the counter value by a second amount, which is different from the first amount, when the operating mode data indicates the transmitter module is in a second of the at least two operating modes.

29. A method as set forth in claim 27 wherein the operating mode data indicates in which of at least two operating modes the transmitter module is operating, said step of adjusting further including adjusting the counter value only when the operating mode data indicates that the transmitter module is in the first operating mode, such that the counter value indicates the duration of an abnormal tire condition while the tire transmitter module is in the first operating mode.

30. A method as set forth in claim 29 wherein the abnormal tire condition is an abnormal pressure condition of the associated vehicle tire, the step of adjusting occurs upon receiving a data message having tire condition data indicating an abnormal pressure condition of the associated vehicle tire, whereby the counted value indicates the duration of an abnormal pressure condition while the transmitter module is in the first operating mode.

31. A method as set forth in claim 29 wherein the abnormal tire condition is an abnormal temperature condition of the associated vehicle tire, and wherein the step of adjusting the counted value is in response to receiving a data message having tire condition data indicating an abnormal temperature condition of the associated vehicle tire, whereby the counted value indicates the duration of the abnormal temperature condition while the tire transmitter module is in the first operating mode.

* * * * *